United States Patent
Miwa et al.

(10) Patent No.: US 7,506,176 B1
(45) Date of Patent: Mar. 17, 2009

(54) ENCRYPTION MECHANISM ON MULTI-CORE PROCESSOR

(75) Inventors: Yohichi Miwa, Yokohama (JP); Aya Minami, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,305

(22) Filed: Mar. 10, 2008

(51) Int. Cl.
*H04L 9/32* (2006.01)

(52) U.S. Cl. .................. 713/192; 713/164; 713/165; 713/189; 713/193; 380/28; 380/37

(58) Field of Classification Search .................. 713/164, 713/165, 189, 192, 193; 380/28, 37
See application file for complete search history.

(56) References Cited

U.S. PATENT DOCUMENTS

| | | | |
|---|---|---|---|
| 6,209,098 B1 * | 3/2001 | Davis ........................ | 713/194 |
| 6,918,034 B1 | 7/2005 | Sengodan et al. | |
| 7,260,215 B2 * | 8/2007 | Troyansky et al. ............ | 380/28 |
| 7,310,423 B2 | 12/2007 | Hobrock et al. | |
| 7,392,399 B2 * | 6/2008 | Grohoski et al. ............ | 713/189 |
| 2004/0151182 A1 | 8/2004 | Kokubo et al. | |
| 2004/0225885 A1 * | 11/2004 | Grohoski et al. ............ | 713/189 |
| 2006/0177053 A1 | 8/2006 | Ohno | |
| 2007/0091886 A1 | 4/2007 | Davis et al. | |
| 2007/0180235 A1 | 8/2007 | Lelegard et al. | |
| 2008/0066074 A1 * | 3/2008 | Nutter et al. ................. | 718/107 |

* cited by examiner

*Primary Examiner*—Kim Vu
*Assistant Examiner*—Beemnet W Dada
(74) *Attorney, Agent, or Firm*—MaxValueIP, LLC

(57) ABSTRACT

An embodiment describes a method of implementing higher level and more robust encryption by using a multi-core processor. The clear text is segmented into text segments based on predefined segment lengths by master processor. Text segments are sent to processing elements which in turn encrypted and encrypted segments are sent back to master processor which is aggregated into encrypted text. To decrypt the text, encrypted text is split into encrypted segments per predefined lengths by master processor and sent to processing elements to be decrypted. The resulted plain text segments are sent back to master processor which is aggregated into original plain text.

1 Claim, 3 Drawing Sheets

ENCRYPTION MECHANISM ON MULTI-CORE PROCESSOR

BACKGROUND OF THE INVENTION

As Internet use is getting more popular the need for information security increases which directly results in increase in the use of encryption. Although encrypted information is not completely secured more sophisticated encryption techniques and algorithms could increase the information confidentiality.

As encryption techniques get more and more sophisticated, the amount of processing power required to encrypt and decrypt the information increases and at the same time it takes longer and longer to perform the task which in most applications is not desirable.

Using two types of encryption schemes raises the encryption level, however may double the time in encryption/decryption. This proposed system addresses this problem by using multi core microprocessors and distributes this tedious task between the processing elements of the multi core micro processor.

SUMMARY OF THE INVENTION

One example of the method describes a method of implementing higher level and more robust encryption faster by using a multi-core processor. Encryption proceeds in following logical steps:

First, master core processor copies the original plain text and predefined segment lengths for each processing element from the main memory into the local memory. Next, master core processor splits the original plain text into segments according the segment lengths. Then, the split segments are sent to each corresponding processing element which in turn encrypted with their own encryption algorithm and encrypted segments are sent back to master processor. Finally master processor concatenates all the segments and copies the resulting encrypted text back into the main memory.

To decrypt the encrypted text, master processor copies the encrypted text from the main memory to local memory, splits the text using the predefined lengths, send the encrypted text segments to corresponding processing elements which in turn are decrypted and the results are sent back. Finally the master processor concatenates all the decrypted text segments and copies the resulted decrypted text back to main memory.

DETAILED DESCRIPTION OF THE PREFERRED EMBODIMENTS

Figure 1:
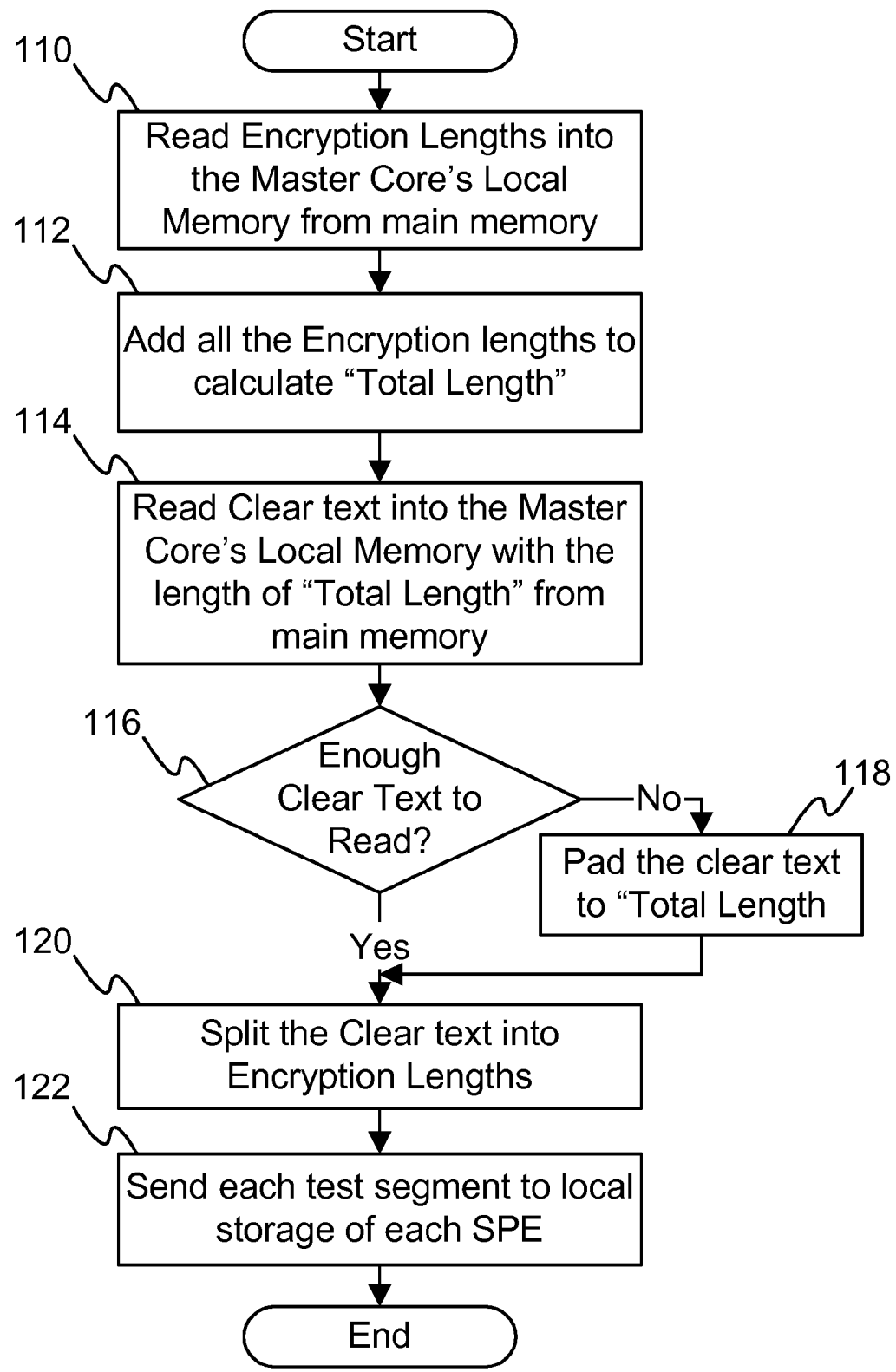
FIG. 1 is the flow diagram for text encryption for master processor.

One example is a method of implementing higher level and more robust encryption faster by using a multi-core processor. The example multi-core processor used for this description includes a Power Processor Element (PPE), a general-purpose core and eight Synergistic Processor Elements (SPE). This architecture is used as an example for describing this new encryption method as any multi-core processor with any number of processing elements could implement this proposed encryption method. The master core referred in this document could be a PPE or any one of several SPEs.

This exemplary method starts when master core processor copies the original plain text which is the target of encryption and predefined segment lengths for each processing element from the main memory into the local memory. This local memory could be cache area for SPE or local storage for PPE or any high speed memory used by the processing element. Next, master core processor splits the original plain text into segments according the segment lengths. If the text length is shorter than the split length, the segment is padded until the proper text segment length is created. Then, the split segments are sent to each corresponding SPE's local storage.

Each SPE encrypts the received plain text segment with a predefined encryption scheme. The encryption scheme may be different or the same among the SPEs. Using different encryption scheme for each SPE raises the encryption level. The encryption scheme to be used may be selected according to the encryption level the information needs. Encrypted data needs to be in a certain length (Segment length) for decryption. If the plain text segment is shorter than the required encryption length, the text is padded.

Each text segment is encrypted at corresponding SPE and transferred to the local memory of the master core. The master core merges the segments of encrypted data that are received from respective SPEs and writes the data to the main memory as the final encrypted text.

The decryption processes proceeds in a reverse order of the encryption processes: The master core reads the encrypted data into the local memory, splits the data into encrypted segment lengths and transfers them to respective SPEs. Each SPE decrypts the text in a predetermined method. The decrypted data is transferred to the local memory of the master core. The master core uses the previously known split lengths for respective SPEs and removes the padded information if required from the decrypted data received from each SPE, concatenates the resulted text segments and writes the decrypted text to the main memory.

Another embodiment of this method is a method of encryption and decryption on a multi-core processor, this method comprising: a master core receiving a plain text and a plurality of plain-text segment lengths into a master core local memory of the master core. The master core splitting the plain text into a plurality of plain-text segments; wherein a first plain-text segment of the plurality of plain-text segments has a first length equal to a first plain-text segment length of the plurality of plain-text segment lengths; forming a first padded-plain-text segment by padding the first plain-text segment by a first number of padding bytes; wherein the first number of padding bytes is equal to a difference between a maximum transfer length and the first length; wherein the maximum transfer length is associated with a first encryption method;

Transferring the first padded-plain-text segment to a first local memory of a first synergistic processor element; wherein the first synergistic processor element is one of a plurality of synergistic processor elements.

The first synergistic processor element encrypting the first padded-plain-text segment to a first encrypted-text segment; wherein in the encrypting step, the first synergistic processor element uses the first encryption method with an encryption key; transferring the first encrypted-text segment from the first local memory to the master core local memory; wherein the first encrypted-text segment is one of a first plurality of encrypted-text segments. The master core aggregating the first plurality of encrypted-text segments into an encrypted text; the master core transferring the encrypted text to a main memory;

The master core reading the encrypted text from the main memory into the master core local memory; the master core splitting the encrypted text into a second plurality of encrypted-text segments; wherein a second encrypted-text segment is one of the second plurality of encrypted-text segments; transferring the second encrypted-text segment from the master core local memory to the first local memory;

The first synergistic processor element decrypting the second encrypted-text segment to a second padded-plain-text segment; wherein in the decrypting step, the first synergistic processor element uses a first decryption method corresponding to first encryption method; transferring the second padded-plain-text segment to the master core local memory from the first local memory; forming a second plain-text segment by removing the first number of padding bytes from the second padded-plain-text segment; wherein the second plain-text segment is one of a second plurality of padded-plain-text segments; the master core aggregating the second plurality of padded-plain-text segments into the plain text; and the master core transferring said plain text to said main memory.

Figure 2:
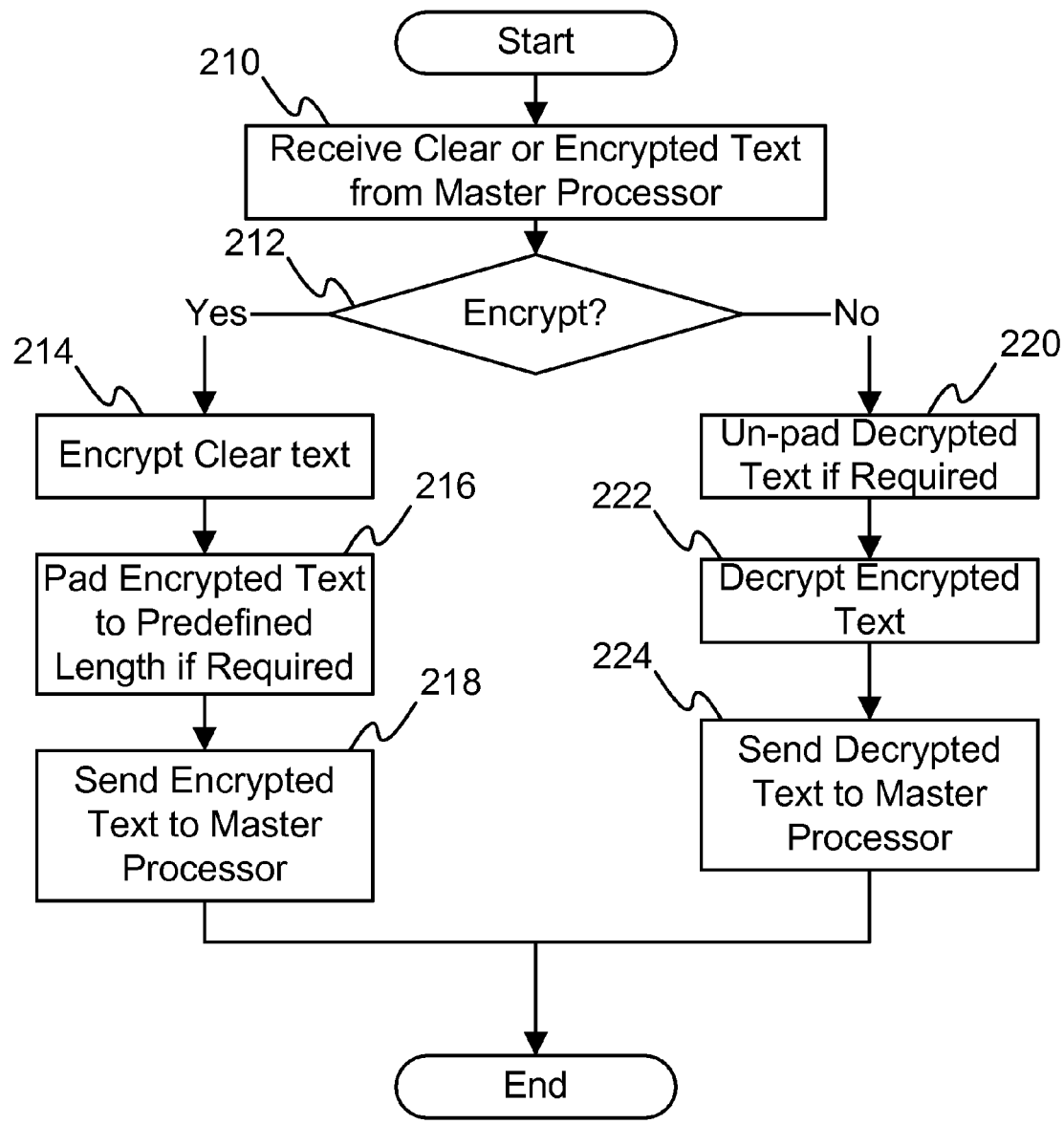
FIG. 2 is the flow diagram of encryption/decryption for SPE.
Figure 3:
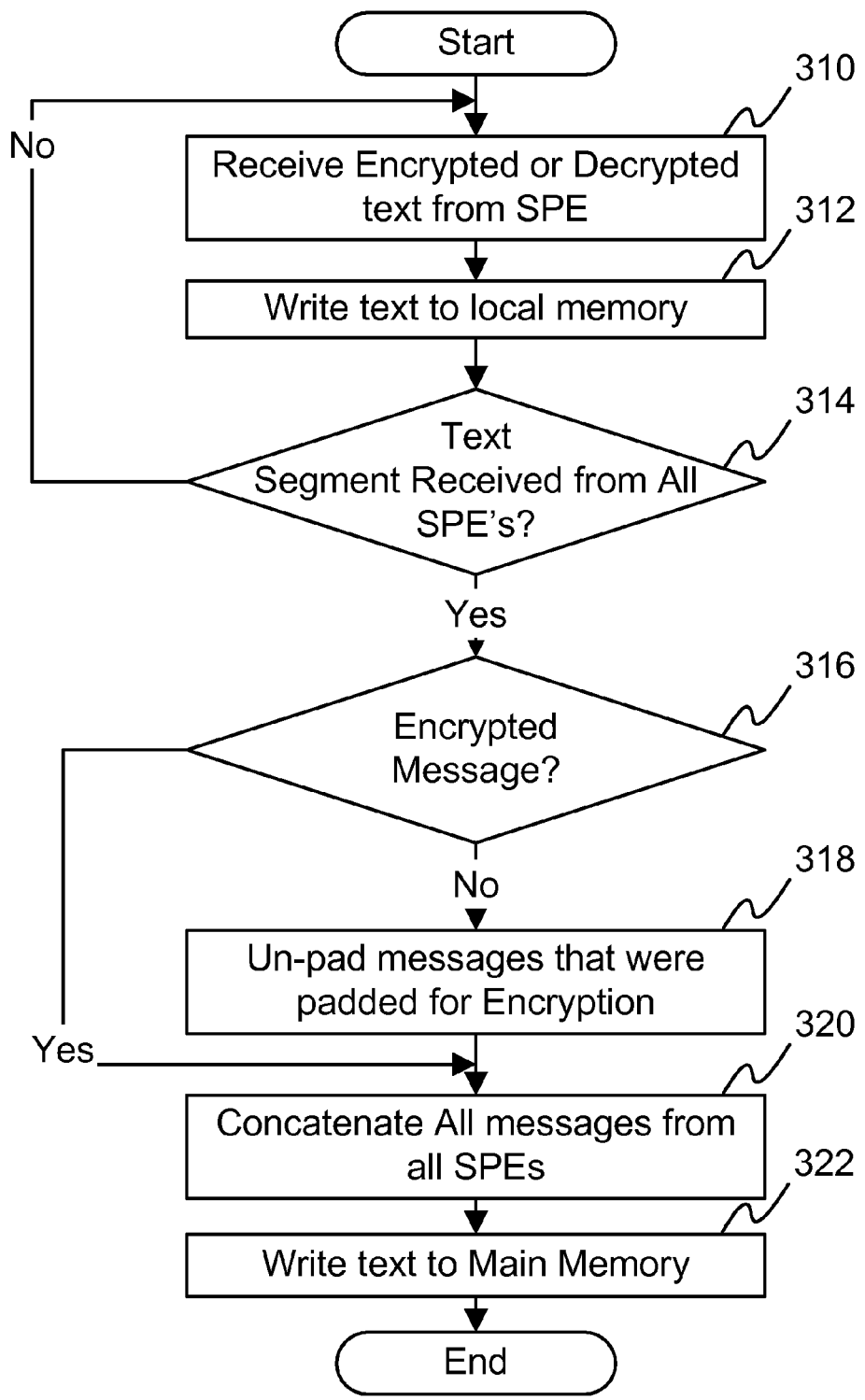
FIG. 3 is the flow diagram for encryption/decryption of master processor.

Another embodiment of this system is depicted in FIGS. 1, 2, 3. Referring to FIG. 1, master core processor reads the encryption lengths for the text segments into the local memory (110), adds the segment lengths together and calculates the total length (112) and uses this total as "total length" to read the plain text from the main memory to master core processor's local memory (114). At this point in the process if there was not enough data left to be read (116), the plain text is padded to create a plain text of the length "total length" (118). At this point the plain text is split with the proper lengths into text segments (120) and text segments are sent to the proper local storage of the SPEs (122).

Referring to FIG. 2, an SPE receives a text segment from master processor (210). SPE decides whether the text segment must be encrypted or decrypted (212). If text segment must be encrypted, SPE uses its predefined encryption method and encrypts the text segment (214). If the encrypted text result length is shorter than predefined encrypted length, the encrypted text is padded to the proper length (216), otherwise no changes are made to the encrypted text and the result is send to the local memory of the master processor (218). If text segment must be decrypted, the encrypted text is un-padded if required (220), SPE then uses it predefined decryption algorithm and decrypts the encrypted text segment (222) and the results is send to the local storage of the master processor (224).

Referring to FIG. 3, master processor receives a text segment from and SPE (310). Master processor writes the received text segment into its local memory (312). Master processor checks to verify if it has received all the text segments from all the SPE's (314). If not all of the text segment is received, master processor waits for the next segment (310). If all the segments are received, master processor decides if the operation was encryption or decryption (316). If text was being decrypted, if any padding was added to any of the text segments, it is removed (318), otherwise no modification is done to the encrypted text segment. At this point mater processor concatenates all the text segments (320) and the result is written back to main memory (322).

A system, apparatus, or device comprising one of the following items is an example of the invention: encryption engine, encryption key, decryption module, secure environment, secure network, multi-core processor, microprocessors, security device, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of encryption and security management.

Any variations of the above teaching are also intended to be covered by this patent application.

The invention claimed is:

1. A method of encryption and decryption on a multi-core processor, said method comprising:

a master core receiving a plain text and a plurality of plain-text segment lengths into a master core local memory of said master core;

said master core splitting said plain text into a plurality of plain-text segments;

wherein a first plain-text segment of said plurality of plain-text segments has a first length equal to a first plain-text segment length of said plurality of plain-text segment lengths;

forming a first padded-plain-text segment by padding said first plain-text segment by a first number of padding bytes;

wherein said first number of padding bytes is equal to a difference between a maximum transfer length and said first length;

wherein said maximum transfer length is associated with a first encryption method;

transferring said first padded-plain-text segment to a first local memory of a first synergistic processor element;

wherein said first synergistic processor element is one of a plurality of synergistic processor elements;

said first synergistic processor element encrypting said first padded-plain-text segment to a first encrypted-text segment;

wherein in said encrypting step, said first synergistic processor element uses said first encryption method with an encryption key;

transferring said first encrypted-text segment from said first local memory to said master core local memory;

wherein said first encrypted-text segment is one of a first plurality of encrypted-text segments;

said master core aggregating said first plurality of encrypted-text segments into an encrypted text;

said master core transferring said encrypted text to a main memory;

said master core reading said encrypted text from said main memory into said master core local memory;

said master core splitting said encrypted text into a second plurality of encrypted-text segments;

wherein a second encrypted-text segment is one of said second plurality of encrypted-text segments;

transferring said second encrypted-text segment from said master core local memory to said first local memory;

said first synergistic processor element decrypting said second encrypted-text segment to a second padded-plain-text segment;

wherein in said decrypting step, said first synergistic processor element uses a first decryption method corresponding to first encryption method;

transferring said second padded-plain-text segment to said master core local memory from said first local memory;

forming a second plain-text segment by removing said first number of padding bytes from said second padded-plain-text segment;

wherein said second plain-text segment is one of a second plurality of padded-plain-text segments;

said master core aggregating said second plurality of padded-plain-text segments into said plain text; and said master core transferring said plain text to said main memory.

* * * * *